(12) United States Patent
Woelfling

(10) Patent No.: US 11,465,566 B2
(45) Date of Patent: Oct. 11, 2022

(54) BICYCLE LEVELER

(71) Applicant: Robert Joseph Woelfling, Pilesgrove, NJ (US)

(72) Inventor: Robert Joseph Woelfling, Pilesgrove, NJ (US)

(73) Assignee: Robert Joseph Woelfling, Pilesgrove, NJ (US)

( * ) Notice: Subject to any disclaimer, the term of this patent is extended or adjusted under 35 U.S.C. 154(b) by 0 days.

(21) Appl. No.: 17/029,804

(22) Filed: Sep. 23, 2020

(65) Prior Publication Data
US 2021/0094478 A1 Apr. 1, 2021

Related U.S. Application Data

(60) Provisional application No. 62/906,892, filed on Sep. 27, 2019.

(51) Int. Cl.
*B60R 9/10* (2006.01)
*B62H 3/12* (2006.01)

(52) U.S. Cl.
CPC ............... *B60R 9/10* (2013.01); *B62H 3/12* (2013.01)

(58) Field of Classification Search
CPC ... B62K 3/04; B62K 13/00; B60R 9/10; B62J 11/00; B62J 1/167
See application file for complete search history.

(56) References Cited

U.S. PATENT DOCUMENTS

| | | | | |
|---|---|---|---|---|
| 5,149,112 A * | 9/1992 | Nauman | ............... | B62J 1/167 280/278 |
| 6,435,523 B1 * | 8/2002 | Hilk | ............... | B60R 9/10 224/426 |
| 6,602,015 B1 * | 8/2003 | Evans | ............... | B60R 9/048 224/924 |
| 10,166,932 B2 * | 1/2019 | Woelfling | ............... | B60R 9/10 |
| 10,266,224 B2 * | 4/2019 | Provost | ............... | B62J 1/28 |
| 10,328,984 B2 * | 6/2019 | Wang | ............... | B62J 23/00 |

* cited by examiner

*Primary Examiner* — Corey N Skurdal
(74) *Attorney, Agent, or Firm* — Potomac Law Group, PLLC

(57) ABSTRACT

The invention was designed to provide a solid, level hang bar utilizing the bicycle's seat post, seat post tube or frame itself which is level adjustable on the bicycle. The rake or angle of the seat post and seat post tube varies and the Bicycle Leveler is adjustable to allow a safe and level carry on a vehicle. The Bicycle Leveler is installed on the bicycle for safe transport and the Level Hang Bar is uniquely removable without tools for safe riding of the bicycle. No other design mounts solidly to the bicycle nor does it have removable level bar feature. The design represents a new methodology for safety in bicycle transport on traditional hang racks.

20 Claims, 8 Drawing Sheets

BICYCLE LEVELER

FIELD OF THE INVENTION

This invention uniquely attaches a removable and adjustable surrogate horizontal top rail to a bicycle seat post or the seat post tube on the frame (identified as Part 1 and Part 24 respectively in FIGS. 1 through 8 and not a Part of the invention) as shown and described herein to a bicycle which does not incorporate a level horizontal top rail in its frame configuration to be carried safely on a typical bicycle hang rack. A level horizontal top rail as used herein is defined as a permanent bicycle frame member which is parallel to a plane bisecting both the front and rear axles of the bicycle if they are the same size and parallel to the plane upon which the bottom point of the front and rear wheels of the bicycle rest is level with the ground. If there is a difference in the wheel diameters of the bicycle, only the wheel with the larger diameter should be considered. This invention will allow any bicycle to be hung level and carried safely on a bicycle hang rack as defined above.

BACKGROUND OF THE INVENTION

A typical bicycle hang rack is a common means of transporting bicycles by motor vehicles of various configurations, and are attached to the carry vehicle either by an adapter which utilizes the vehicle's trailer hitch, a bumper mounted adapter, or by cables and clips that attach the hang rack to either a rear hatch or trunk lid. These racks usually employ a pair of parallel arms which extend beyond a vertical member of the hang rack and the rear of the vehicle and perpendicular to the rear of the carry vehicle from the basic geometry of the rack design to allow up to 4 bicycles to hang behind the vehicle. To ensure safe transport, the hang rack must be properly installed on the transport vehicle so that the arms which extend beyond and perpendicular to the rear of the transport vehicle are both in the same horizontal and level plane across the parallel arms of the hang rack. This plane should be parallel to a plane on the carrying vehicle such as a plane bisecting the vehicle bumper brackets, floor pan, truck bed, vehicle load compartment including cargo area of an SUV or automobile, etc., which is typically level to the ground when the vehicle is in a level position.

Many bicycles do not have a frame design which allows the bicycle to hang centered or level on the vehicle, and many hang with wheels below the rear bumper on the carry vehicle hang rack creating a potential safety hazard by contact with street debris, roadway irregularities and/or curbing. This invention allows any bicycle including what are known as "girl's or women's" bicycles, children's bicycles, unisex bicycles, and any other frame configuration without an incorporated and level horizontal top frame member between the seat post tube and the head tube through which the front fork mounts to be carried properly centered and above the bottom of the rear bumper of the carry vehicle. Historically, men's and boy's bicycles have generally been designed with the level, horizontal top frame member there are many examples of these bicycles with non-level top frame members because bicycle design has evolved and many more models now incorporate non-level top frame members (if they have them at all) which leaves the hang rack incapable of keeping the transported bicycles level and safe as they are being transported. The Bicycle Leveler can solve this problem.

SUMMARY OF THE INVENTION

With all the bicycle hang racks in use, safety has been the primary motivation in the development of the Bicycle Leveler. The present invention is particularly directed to a device which adapts any bicycle as shown, discussed and described herein which does not incorporate a true horizontal top rail in its frame configuration to be carried safely on a typical bicycle hang rack whether mounted to a trunk lid, a station wagon lift gate, an automobile or SUV with a hatch back, a bumper mount or a trailer hitch mounted hang rack. With this design, bicycles with a true horizontal top rail can also benefit by using the Bicycle Leveler.

Safety is hanging and carrying the bicycle level, and centered on the vehicle, and carried so that a plane upon which the bottom points of both the front and rear wheels of the bicycle rest when that plane is level with the ground. When both wheels on the bicycle are the same diameter, (the normal configuration) a plane bisecting both the front and rear axles of the bicycle will also be parallel to the ground and to various planes on the carrying vehicle when properly mounted. If there is a difference in the wheel diameters of the bicycle, only the wheel with the larger diameter should be considered. Such planes are those which bisect the vehicle bumper brackets, floor pan, truck bed, vehicle load compartment including cargo area of an SUV or automobile, etc., which are typically level when the vehicle is level to the ground. Placement options of this invention, when attached to the bicycle, allow the lowest arc of the wheels (where the wheels meet the ground) to be carried above the lowest non-suspension components of the carrying vehicle such as the bottom of the rear bumper or above the top of the hitch receiver, the safe carry.

The centered/level carry insures the safety of the bicycle being carried, and of the safety of the adjacent pedestrians and motorists in the event the bicycle becomes a flying object by colliding with road debris, rigid roadside objects or other vehicles. This can happen if one or both wheels of the bicycle hang below the rear bumper, or if one of the wheels extends beyond the side of the carry vehicle because the bicycle in not centered on the vehicle, and impacts some other vehicle or stationary object during the carry. Many times, the frame design or size of the bicycle precludes horizontal centering, and a hang height above the lowest horizontal structure of the vehicle excluding the suspension components typically below the bottom of the rear vehicle bumper. The level carry also helps insure there is minimal or no visual obstruction out the rear window view of the carry vehicle.

Many bicycles are now manufactured without the true horizontal top rail including women's bicycles, so called unisex bicycles, mountain/trail bicycles and many children's bicycles. In addition, many of the new designs for the so called man's and boy's bicycle, the style which became the norm for rack design, have moved away from strictly level horizontal top rails configuration. This invention can also be used by virtually any bicycle style, even those with the traditional level horizontal top rail configuration which allows the bicycle so equipped to actually mount the bicycle higher on the hang rack by installing the Bicycle Leveler below the existing horizontal top rail allowing the bottom of the bicycle wheels to be safely above the bottom of the vehicle frame. This is especially important for very tall riders whose actual frame dimensions put the bicycle wheels in harms way because the distance from the factory designed level horizontal top rail to the plane upon which the bottom point of the front and rear wheels of the bicycle rest is level with the ground but is greater than the distance from the top of the parallel bars which actually hold the bicycle on the hang rack to the bottom of the transport vehicle's bumper. Without this invention, bicycles lacking a level horizontal frame member typically hang on the transport rack with the front wheel of the bicycle below the rear bumper where it could contact various road hazards and the rear wheel and part of the frame are so high that they could obstruct the vision through the rear window of the vehicle or the bicycle itself mounts so high on the hang rack that the whole frame of the bicycle obstructs the rear vision of the driver.

BRIEF DESCRIPTIONS OF THE DRAWINGS

FIG. 1 is a perspective view of the first illustrative Bicycle Leveler mount of the present invention mounted on a standard bicycle seat post 1 or seat post tube frame 24 (which are not components of the invention).

FIG. 2 is a perspective view of the first illustrative Bicycle Leveler mount of the present invention mounted on a standard bicycle seat post 1 or seat post tube frame 24 (which are not components of the invention) taken along line 32-32 on FIG. 1.

FIG. 3 is a perspective, exploded view of the Bicycle Leveler mount of FIG. 1 showing various parts of the invention with 1 (one) component touching the seat post 1 or seat post tube frame 24 (which are not components of the invention) and the removable level hang bar is shown separately.

Figure 5:
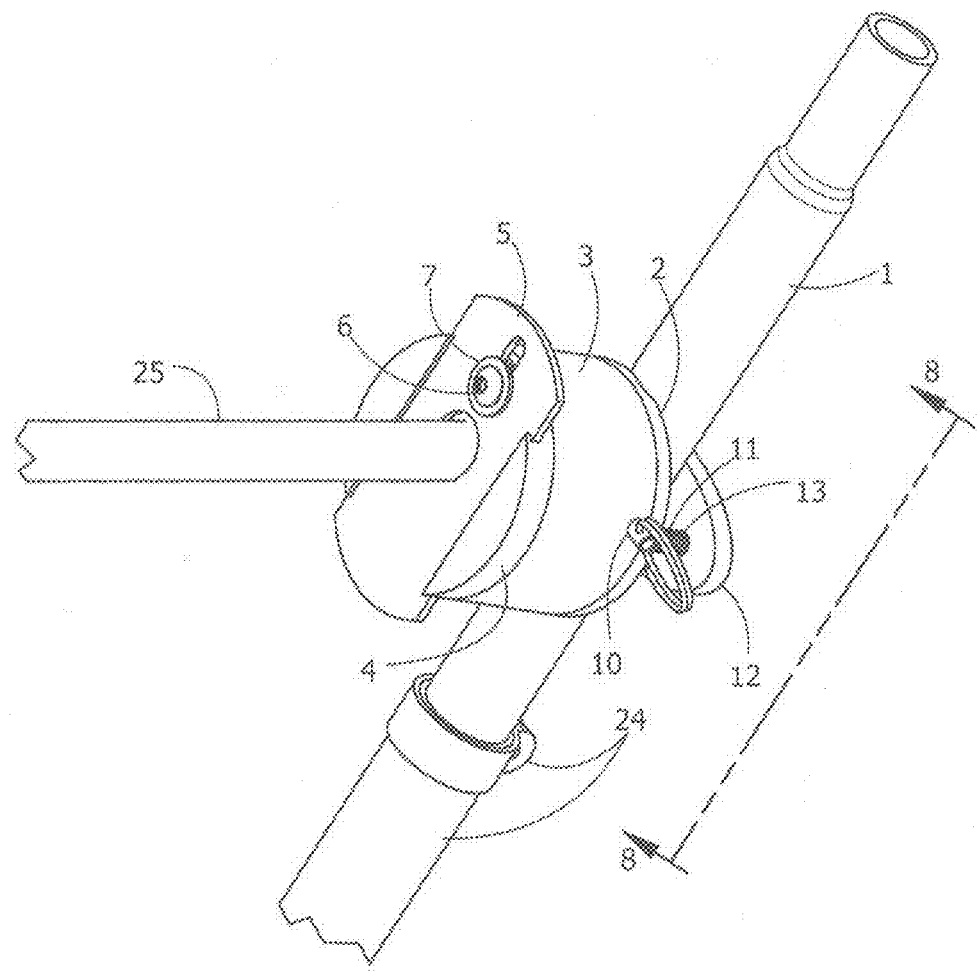
FIG. 5 is a perspective view of the second illustrative Bicycle Leveler mount of the present invention mounted on a standard bicycle seat post 1 or seat post tube frame 24 (which are not components of the invention).
Figure 6:
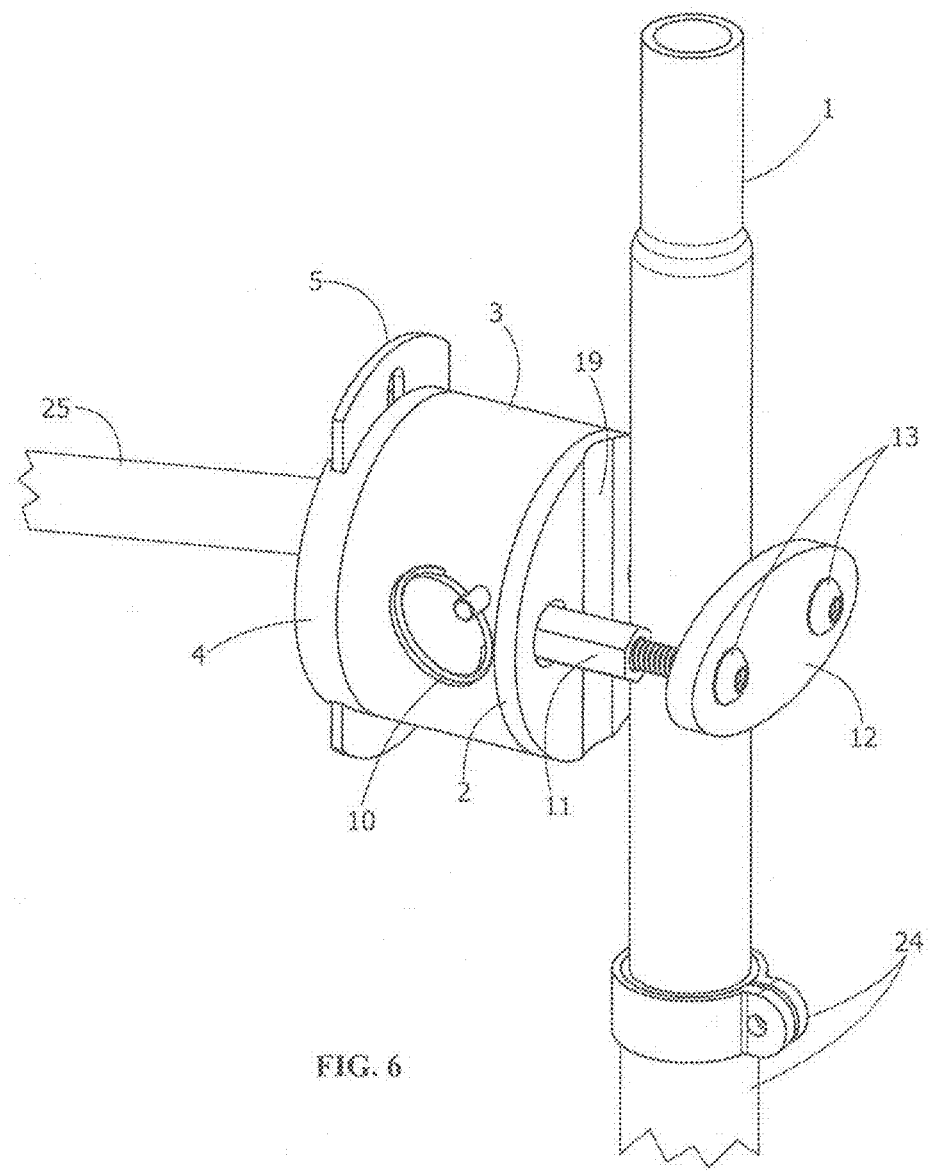

FIG. 6 is a perspective view of the second illustrative Bicycle Leveler mount of the present invention mounted on a standard bicycle seat post 1 or seat post tube frame 24 (which are not components of the invention) taken along line 33-33 on FIG. 5.

Figure 7:
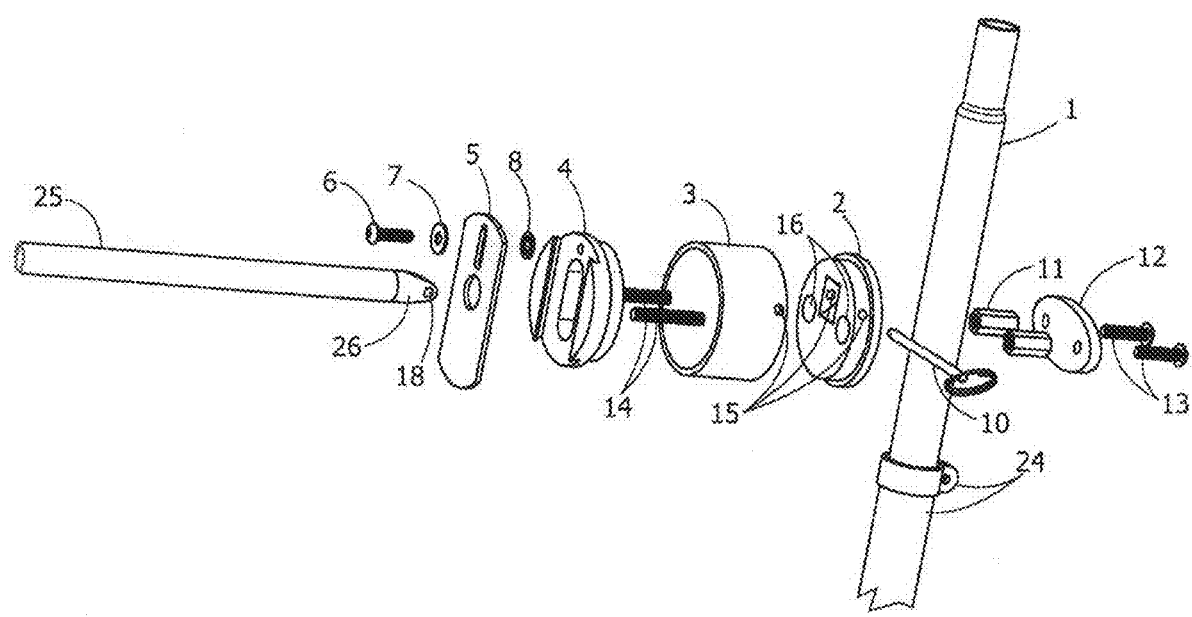

FIG. 7 is a perspective, exploded view of the Bicycle Leveler mount of FIG. 5 showing various parts of the invention with 1 (one) component touching the seat post 1 or seat post tube frame 24 (which are not components of the invention) and the totally removable level hang bar is shown separately.

Figure 8:
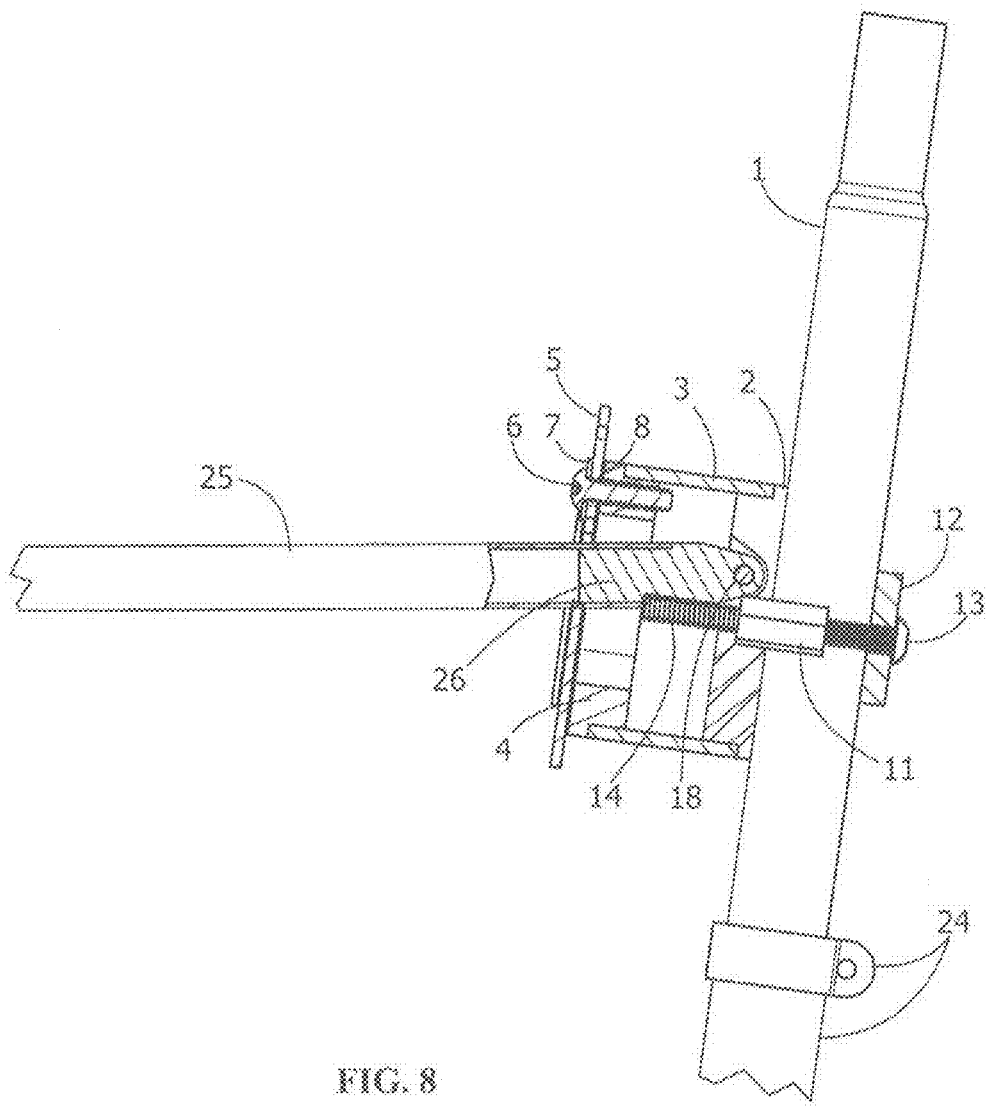

FIG. 8 is a cross section view of the Bicycle Leveler mount of FIG. 5 taken along line 21-21 on FIG. 5.

DETAILED DESCRIPTIONS OF THE INVENTION

The description of illustrative embodiments according to principles of the present invention is intended to be read in connection with the accompanying drawings, which are to be considered part of the entire written description. In the description of embodiments of the invention disclosed herein, any reference to the direction or orientation is merely intended for convenience of description and is not intended in any way to limit the scope of the present inception. Relative terms such as "level," "lower," "upper," "horizontal," "parallel," "vertical," "above," "below," "up," "down," "top," "bottom," "center," and "centered" as well as derivatives thereof (e.g., "horizontally," "downwardly," etc.) and abstract terms such as "plane" should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in combinations of features, the scope of the invention being defined by the claims appended hereto.

Figure 1:
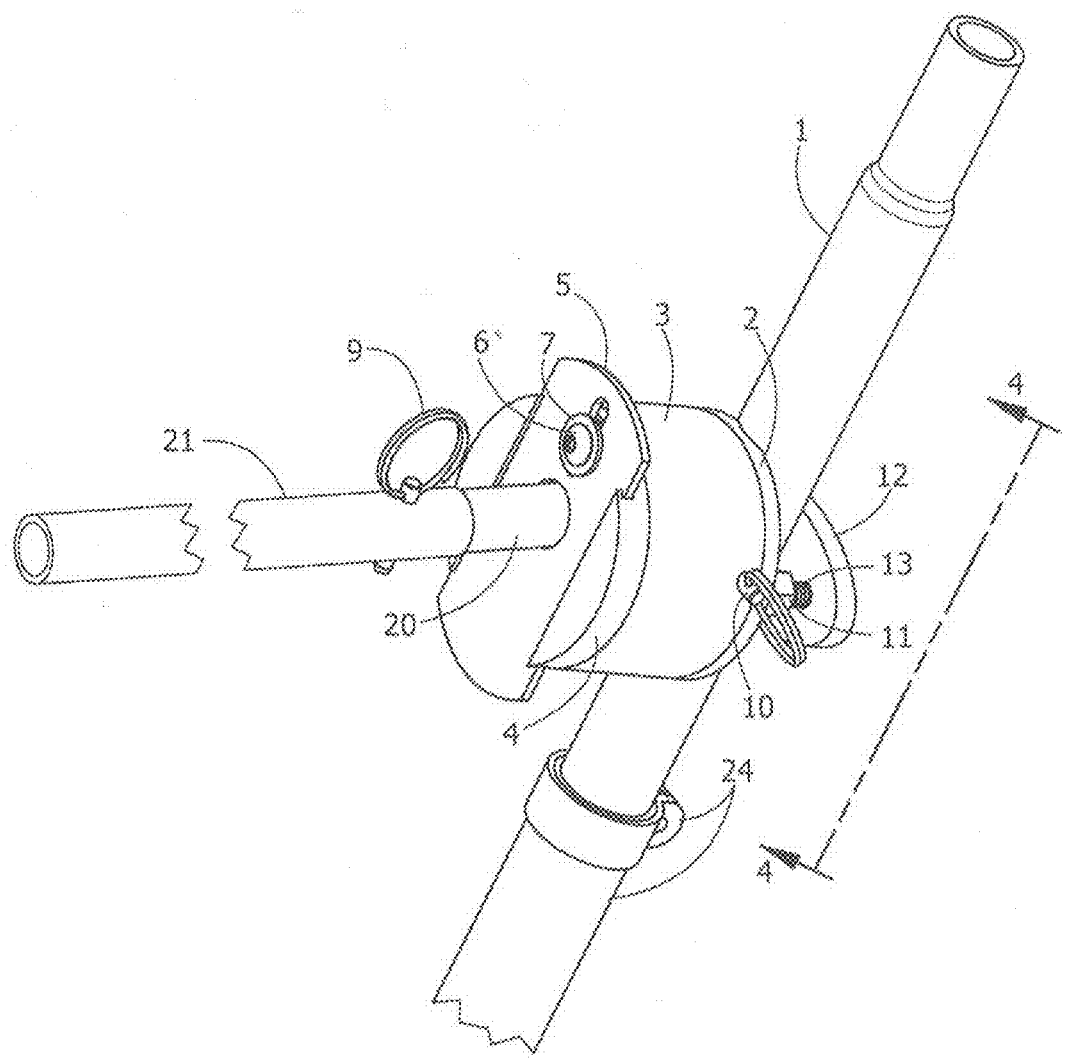
Figure 2:
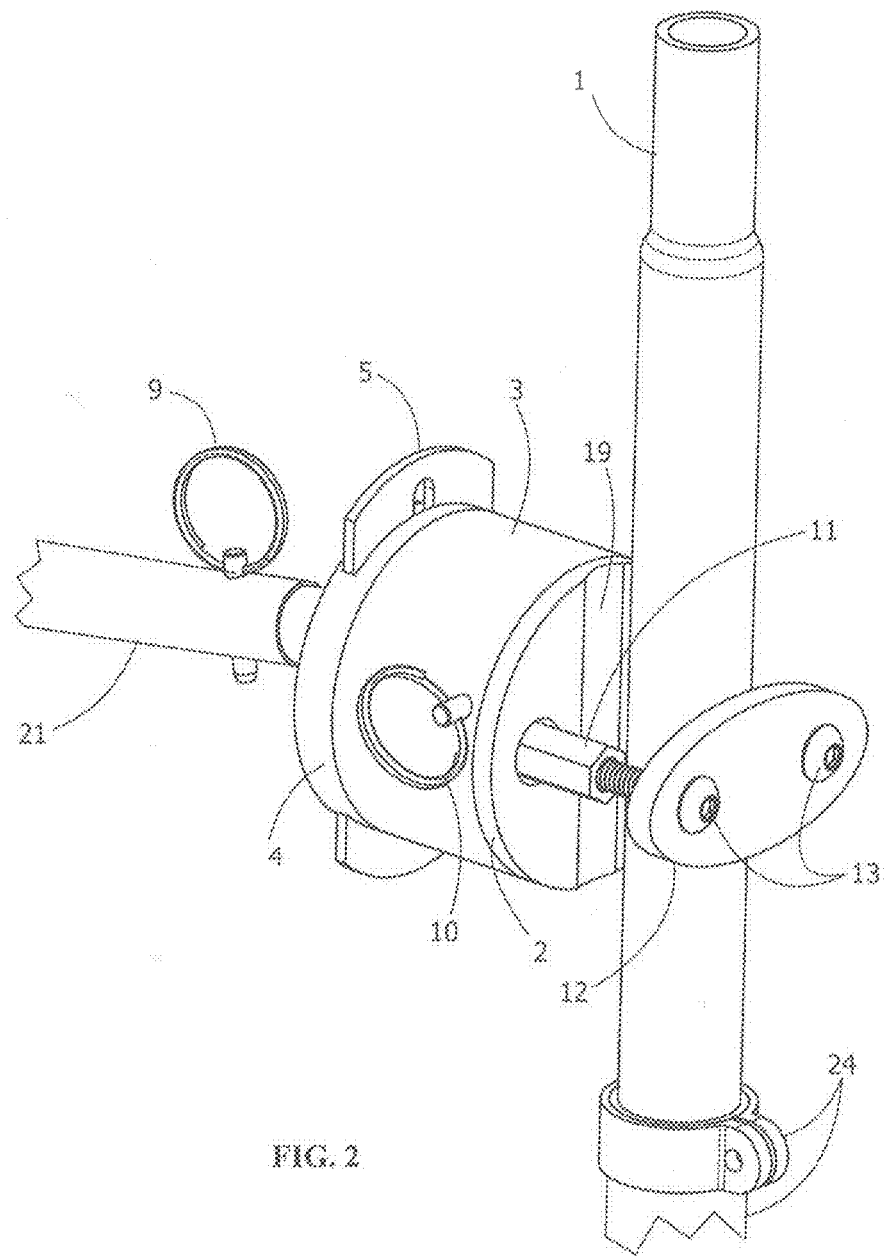

As shown in FIG. 2, a first illustrative embodiment of the Bicycle Leveler mount has a bicycle attachment to 1, a standard seat post on the bicycle or 24, the seat post tube on the bicycle frame (not components of the invention), including 12, the Back Plate Clamp secured by 11, two machine screws to two coupling nuts at the back of 2, the Receiver Back Plate. Also visible in this view is 19, a shallow slot centered between the two coupling nuts which secure the assembly. This slot insures proper center mounting of the Bicycle Leveler to the seat post or seat post receiver in the frame. Refer to FIG. 2 for clarity which is the view along the line 32-32 in FIG. 1. All parts are dimensioned to cooperate with each other in the assembly described herein. Other methods of attaching the Bicycle Leveler receiver to seat post or the seat post tube on the frame or the frame itself can be configured without departing from the scope of the invention.

Figure 3:
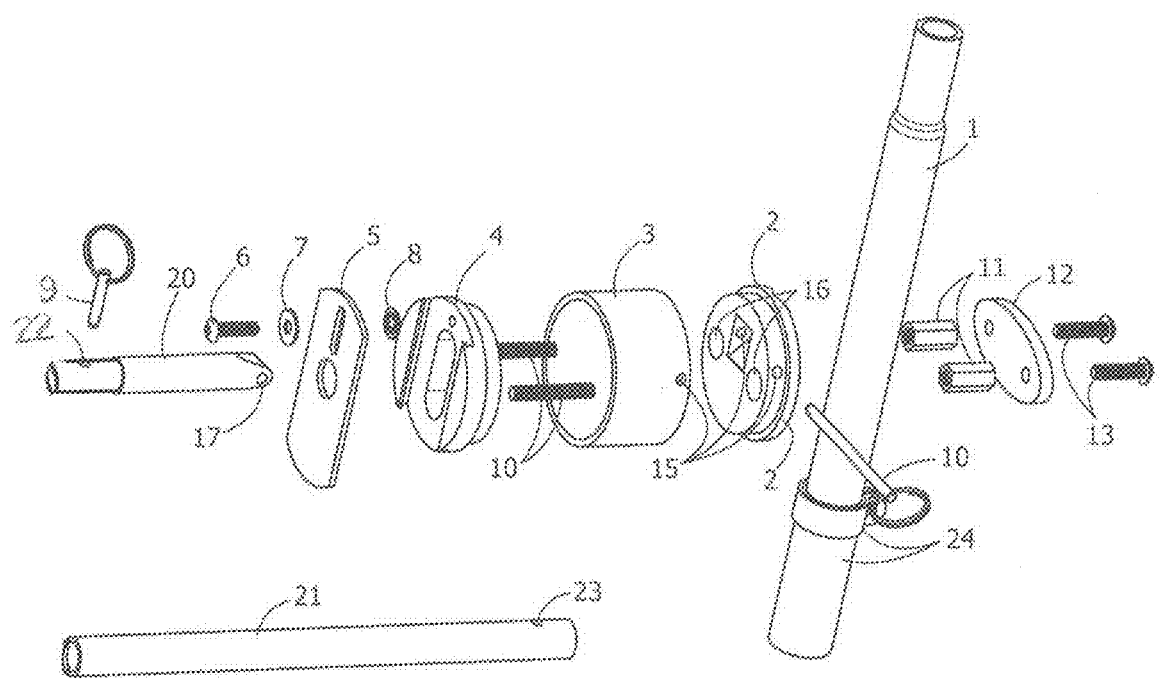
Figure 4:
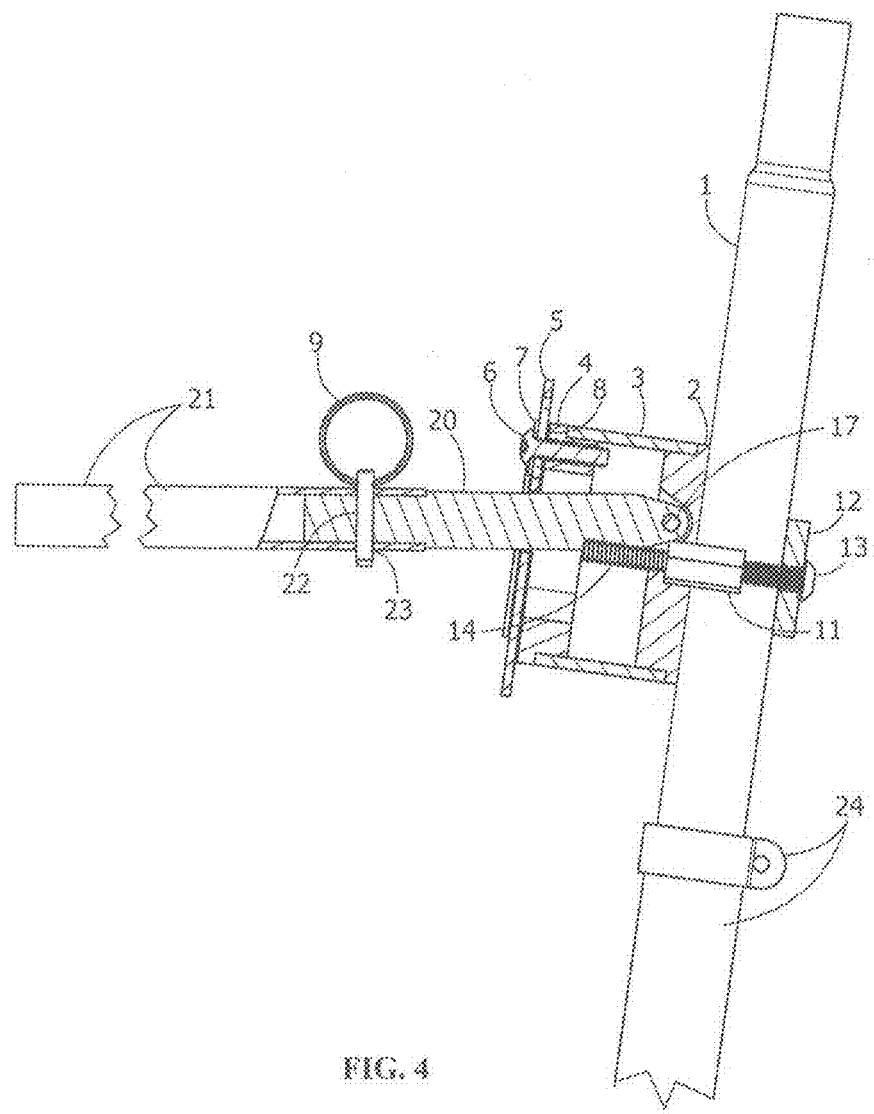
FIG. 4 is a cross section view of the Bicycle Leveler mount of FIG. 1 taken along line 20-20 on FIG. 1.

As shown in FIGS. 1, 3 and 4, a first illustrative embodiment of the Bicycle Leveler, the adjustment of the Removable Level Hang Bar Pivot 20, and Level Hang Bar Extension 21, is accomplished by pivot of the Level Hang Bar using hole 17, in the Level Hang Bar Pivot 20, by inserting the detent pin 10 through the holes 15 in the Receiver Center Case 3, and the Receiver Back Plate 2, all of which are dimensioned to cooperate with each other to give the Level Hang Bar Pivot 20 the ability to be adjusted to a level position. To hold the adjustment of the Level Hang Bar Extension 21, the Level Hang Bar Pivot 20, passes through a hole in the Level Hang Bar Slide 5 which, in turn is dimensioned to cooperate with the Receiver Front Plate 4 which incorporates a captive slot allowing the adjustability of the Level Hang Bar Slide 5. The locking screw 6 plus a flat washer extends through a cooperating slot in 5, followed by a lock washer, then into the Level Hang Bar Slide, all of which is dimensioned to cooperate with a threaded hole in 4, the Receiver Front Plate. Other methodologies can be employed to adjust and lock the adjustment of the Level Hang Bar Extension 21, and Level Hang Bar Pivot 20 without departing from the scope of the invention.

As shown in FIGS. 1, 3 and 4, a first illustrative embodiment of the Bicycle Leveler incorporates a Removable Level Hang Bar Pivot 20, and Level Hang Bar Extension 21. The Level Hang Bar Extension 21 is removable for normal bicycle riding by removing detent pin 9 from hole 23 in the Level Hang Bar Extension 21, and hole 22 in the Level Hang Bar Pivot 20, which are both dimensioned to cooperate with detent pin 9. Detent pin 10 is for removal of the Level Hang Bar Pivot 20 only from holes 15 which are both dimensioned to cooperate with detent pin 10 in the Receiver Center Case 3, the Receiver Back Plate 4 and the hole 17 in the Level Hang Bar Pivot 20. Other methods of attaching the Level Hang Bar Pivot 20, and the Level Hang Bar Extension 21, can be configured without departing from the scope of the invention.

As shown in FIGS. 3 and 4, a first illustrative embodiment of the Bicycle Leveler has the basic components 2 through 20 which make up the Receiver Housing Assembly. These components are all dimensioned to cooperate with each other to create the Receiver Housing Assembly 1. On the Receiver Front Plate 4, the two threaded studs 14 are first inserted into the threaded holes on the inside surface and extend through the Receiver Case 3 and then through holes 16 in the Receiver Back Plate 2, and finally the studs protrude beyond the holes 16 where the parts are secured by two coupling nuts 11 at the rear of the Receiver Back Plate 2 to form the Receiver Housing Assembly 1. Finally, the Level Hang Bar Pivot 20 is installed through the Level Hang Bar Slide 5, the Receiver Front Plate 4, the Receiver Case 3 and into a recess in Receiver Back Plate 2, a detent pin 10 is inserted into Holes 15 in the Receiver Case 3 and the Receiver Back Plate 2 to secure the Level Hang Bar Pivot 20 into the Receiver Housing Assembly 1 for this embodiment. Other methodologies of components and assembly can be employed without departing from the scope of the invention.

As shown in FIG. 6, a second illustrative embodiment of the Bicycle Leveler mount has a bicycle attachment to 1, a standard bicycle seat post on the bicycle or 24, the seat post tube on the bicycle frame (not components of the invention), and including 12, a Back Plate Clamp 12 secured by two machine screws 13 to two coupling nuts 11 at the back of 2, the Receiver Back Plate. Also visible in this view is 19, a shallow slot centered between the two coupling nuts which secure the assembly. This slot insures proper center mounting of the Bicycle Leveler. These coupling nuts are dimensioned to cooperate with the studs 14 which are discussed in [0016] preceding secure the whole assembly. Refer to FIG. 6 for clarity which is the view along the line 33-33 in FIG. 5. Other methods of attaching the Bicycle Leveler receiver to seat post or the seat post receiver (frame) can be configured without departing from the scope of the invention.

As shown in FIGS. 5, 7 and 8, a second illustrative embodiment of the Bicycle Leveler, the adjustment of the Removable Level Hang Bar 25 is accomplished by pivot of the Removable Level Hang Bar 25, using the detent pin 10 through the Receiver Back Plate 2, and receiver housing at 15. The angle of the Removable Level Hang Bar 20 is adjusted using the Level Hang Bar Slide 5 which is dimensioned to cooperate with a slot on the front of 4, the Receiver Front Plate. The locking screw 6 with flat washer 7 extends through a slot in 5, the Level Hang Bar Slide, with a lock washer 8 into a threaded hole in 4, the Receiver Front Plate, all of which are dimensioned to cooperate with the threaded hole in 4. Other methodologies can be employed to adjust and lock the adjustment of the Removable Level Hang Bar 20 without departing from the scope of the invention.

As shown in FIGS. 5, 7 and 8, a second illustrative embodiment of the Bicycle Leveler, the removal of the Removable Level Hang Bar 25 is accomplished by removing the detent pin 10 through the Receiver Center Case 3, and the Receiver Back Plate 2, from holes 15, one of which is visible in the Receiver Center Case 3, and two are invisible (see FIG. 7) in the Receiver Back Plate 2 and hole 18 in the Removable Level Hang Bar 25. The Removable Level Hang Bar 25, which is dimensioned to cooperate with the Level Hang Bar Slide 5 and the Receiver Front Plate 4 is simply removed from the Receiver Housing Assembly (2 through 14 in FIGS. 5, 7 and 8) by removal of detent pin 10 for normal riding of the bicycle. To re-insert, the process is simply reversed. Other methodologies can be employed to remove and re-insert the Removable Level Hang Bar 25 without departing from the scope of the invention.

As shown in FIGS. 7 and 8, a second illustrative embodiment of the Bicycle Leveler has the basic components 2 through 18 which make up the Receiver Housing Assembly. These components are all dimensioned to cooperate with each other to create the Receiver Housing Assembly. On the Receiver Front Plate 4, the two threaded studs 14 are first inserted into the threaded holes on the inside surface and extend through the Receiver Case 3 and then through holes 16 in the Receiver Back Plate 2 and finally the studs protrude beyond the holes 16 where the parts are secured by two coupling nuts 11 at the rear of the Receiver Back Plate 2 to form the Receiver Housing Assembly for this embodiment. Other methodologies of components and assembly can be employed without departing from the scope of the invention.

While the invention has been described with reference to preferred embodiments, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials and components, and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claims:

1. A bicycle leveler mount device for mounting a bicycle to a bicycle rack of a vehicle, the device comprising:
   a clamp for attaching the bicycle leveler mount device to a seat post or frame of the bicycle;
   a receiving case having a back plate and a front plate, the back plate engages the seat post or frame of the bicycle and cooperates with the clamp to maintain the bicycle leveler mount device in position on the bicycle, the front plate having an elongated slot and a mounting opening;
   a level hang bar slide mounted on the front plate of the receiving case, the level hang bar slide having an opening which is aligned with the elongated slot of the front plate;
   a hang bar extending from the receiving case through the elongated slot of the front plate and the opening in the level hang bar slide;
   wherein the hang bar can be adjusted relative to the receiving case and the clamp to position a longitudinal axis of the hang bar rail parallel to the ground and parallel to the plane extending between an axle of a front wheel of the bicycle and an axle of a rear wheel of the bicycle;
   wherein when the bicycle is not positioned on the bicycle rack, the hang bar may be removed from the receiving case.

2. The bicycle leveler mount device as recited in claim 1, wherein the clamp is secured to the back plate of the receiving case by two screws and two coupling nuts.

3. The bicycle leveler mount device as recited in claim 1, wherein a slot is provided in the back plate of the receiving case, the slot faces the clamp and is dimensioned to engage the seat post or frame of the bicycle to properly position the bicycle leveler mount device relative to the bicycle.

4. The bicycle leveler mount device as recited in claim 1, wherein the hang bar has a mounting opening proximate an end thereof, the mounting opening is positioned in the receiving case.

5. The bicycle leveler mount device as recited in claim 4, wherein openings in side walls of the receiving case are aligned with the mounting opening of the hang bar, wherein a detent pin is inserted into the openings in the side walls of the receiving case and the mounting opening of the hang bar to pivotably mount the hang bar relative to the receiving case.

6. The bicycle leveler mount device as recited in claim 5, wherein the level hang bar slide is movable relative to the front plate of the receiving case, wherein the level hang bar slide can be moved in a direction which is essentially parallel to a longitudinal axis of the elongated slot of the front plate, allowing the hang bar to be pivoted about the detent pin.

7. The bicycle leveler mount device as recited in claim 6, wherein a mounting slot is provided in the level hang bar slide, the mounting slot is configured to receive mounting hardware therethrough.

8. The bicycle leveler mount device as recited in claim 7, wherein a mounting opening is provided in the front plate of the receiving case, the mounting opening is provided in alignment with the mounting slot of the level hang bar slide, the mounting opening is configured to receive the mounting hardware, wherein when the hang bar is properly positioned relative to the bicycle, the mounting hardware is tightened to prevent the movement of the level hang bar slide relative to the receiving case and relative to the bicycle.

9. The bicycle leveler mount device as recited in claim 1, wherein a hang bar extension is provided on the hang bar, the hang bar extension is removable from the hang bar and extends from an end of the hang bar which is positioned outside of the receiving case.

10. The bicycle leveler mount device as recited in claim 9, wherein a securing detent pin extends through pin receiving openings in the hang bar extension and pin receiving openings in the hang bar to removably mount the hang bar extension to the hang bar.

11. The bicycle leveler mount device as recited in claim 1, wherein the front plate is secured to the receiving case by threaded studs which are inserted into openings which are positioned on an inside surface of the front plate.

12. The bicycle leveler mount device as recited in claim 11, wherein the threaded studs extend through the receiving case and through opening in the back plate, coupling nuts are provided on the threaded studs to retain the front plate and back plate in position relative to the receiving case.

13. A bicycle leveler mount device for mounting a bicycle to a bicycle rack of a vehicle, the device comprising:
 a clamp for attaching the bicycle leveler mount device to a seat post or frame of the bicycle;
 a receiving case having a back plate and a front plate, the back plate engages the seat post or frame of the bicycle and cooperates with the clamp to maintain the bicycle leveler mount device in position on the bicycle, the front plate having an elongated slot and a mounting opening;
 a level hang bar slide mounted on the front plate of the receiving case, the level hang bar slide having an opening which is aligned with the elongated slot of the front plate, the level hang bar slide is movable relative to the front plate of the receiving case;
 a hang bar extending from the receiving case through the elongated slot of the front plate and the opening in the level hang bar slide;
 wherein the level hang bar slide can be moved in a direction which is essentially parallel to a longitudinal axis of the elongated slot of the front plate;
 wherein the hang bar can be adjusted relative to the receiving case and the clamp to position a longitudinal axis of the hang bar rail parallel to the ground and parallel to the plane extending between an axle of a front wheel of the bicycle and an axle of a rear wheel of the bicycle.

14. The bicycle leveler mount device as recited in claim 13, wherein the hang bar has a mounting opening proximate an end thereof, the mounting opening is positioned in the receiving case.

15. The bicycle leveler mount device as recited in claim 14, wherein openings in side walls of the receiving case are aligned with the mounting opening of the hang bar, wherein a detent pin is inserted into the openings in the side walls of the receiving case and the mounting opening of the hang bar to pivotably mount the hang bar relative to the receiving case, wherein as the level hang bar slide is moved relative to the front plate of the receiving case, the hang bar is pivoted about the detent pin.

16. The bicycle leveler mount device as recited in claim 15, wherein a mounting slot is provided in the level hang bar slide, the mounting slot is configured to receive mounting hardware therethrough.

17. The bicycle leveler mount device as recited in claim 16, wherein a mounting opening is provided in the front plate of the receiving case, the mounting opening is provided in alignment with the mounting slot of the level hang bar slide, the mounting opening is configured to receive the mounting hardware, wherein when the hang bar is properly positioned relative to the bicycle, the mounting hardware is tightened to prevent the movement of the level hang bar slide relative to the receiving case and relative to the bicycle.

18. The bicycle leveler mount device as recited in claim 17, wherein a slot is provided in the back plate of the receiving case, the slot faces the clamp and is dimensioned to engage the seat post or frame of the bicycle to properly position the bicycle leveler mount device relative to the bicycle.

19. The bicycle leveler mount device as recited in claim 18, wherein a hang bar extension is provided on the hang bar, the hang bar extension is removable from the hang bar and extends from an end of the hang bar which is positioned outside of the receiving case.

20. The bicycle leveler mount device as recited in claim 19, wherein a securing detent pin extends through pin receiving openings in the hang bar extension and pin receiving openings in the hang bar to removably mount the hang bar extension to the hang bar.

* * * * *